July 5, 1932.     M. ARTZT ET AL     1,866,340
SYNCHRONIZING APPARATUS
Filed July 16, 1929
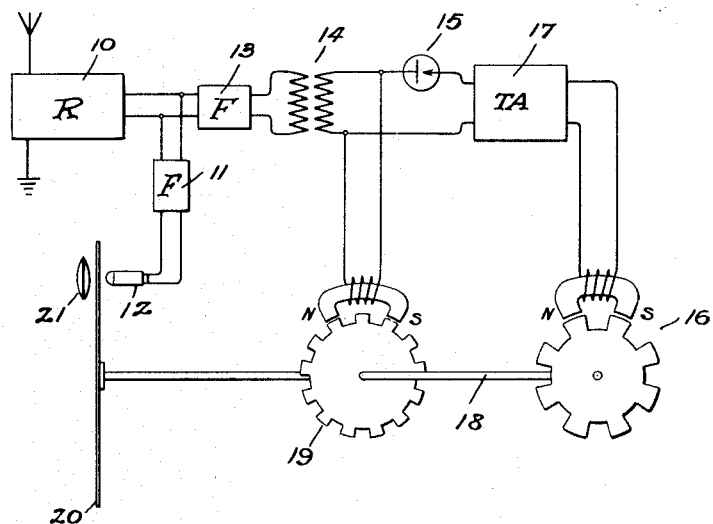
Inventors:
Maurice Artzt,
Robert Serrell,
by Charles V. Miller
His Attorney.

Patented July 5, 1932

1,866,340

UNITED STATES PATENT OFFICE

MAURICE ARTZT, OF SCOTIA, AND ROBERT SERRELL, OF SCHENECTADY, NEW YORK, ASSIGNORS TO GENERAL ELECTRIC COMPANY, A CORPORATION OF NEW YORK

SYNCHRONIZING APPARATUS

Application filed July 16, 1929. Serial No. 378,768.

Our invention relates to a synchronizing apparatus suitable for use in picture transmitting or like systems, and has for its principal object the provision of an improved synchronizing apparatus for use in cases where the synchronizing frequency signals are superimposed on the communication signals.

It is desirable that the frequency band utilized in the transmission of pictures be comparatively wide. In cases where the synchronizing frequency signals are superimposed on the communication channel signals, it is necessary to select the synchronizing frequency sufficiently remote from the communication signal frequencies and their harmonies to avoid interference with the communication signals. It has been found that the synchronizing frequency transmitted over the communication channels for transmitting pictures is usually either too high to operate a synchronous motor of the usual type or too low to be separated from the transmission signal.

In accordance with our invention this difficulty is avoided by utilizing synchronizing signals of a frequency which is well above the frequency band of the communication signals, and generating locally a current of a frequency which may be heterodyned with the synchronizing signals to produce a frequency low enough for operating a synchronous motor or other device for driving the movable parts of the receiver.

Our invention will be better understood from the following description when considered in connection with the accompanying drawing and its scope will be pointed out in the appended claims.

The drawing is a wiring diagram of a picture receiving apparatus wherein our invention has been embodied. This apparatus includes a radio receiver 10 to which the communication and synchronizing signals are supplied, the synchronizing signals being superimposed upon the signals by which the picture or message is transmitted. The communication signals are supplied through a filter 11 to a lamp 12, which produces a light dependent on the signal strength. The synchronizing signals are supplied to a synchronous motor 16 through a filter 13, a transformer 14, a rectifier 15 and an amplifier 17 which is tuned to the frequency of the synchronous motor 16. Mounted upon the same shaft 18 as the motor 16 is an alternating current generator 19 which has its output circuit connected in parallel with the secondary circuit of the transformer 14. Any suitable means such as a crank or a starting motor may be provided for bringing the motor 16 up to its operating speed. The proper angular relation between the movable parts of the transmitter and receiver is readily established by restarting the motor when the relation is incorrect. Under these conditions the current supplied to the synchronous motor 16 has a frequency which is the resultant of the synchronizing signal frequency and the frequency of the current generated by the alternator 19. This frequency is selected by the tuned amplifier 17 out of the several frequencies present in the output of the rectifier 15. Thus if it is assumed that the alternator 19 has 160 poles and the synchronous motor 16 has 8 poles and that the synchronizing signals have a frequency of 5040 cycles per second, the current generated by the alternator 19 will have a frequency of 4800 cycles and the current supplied to the synchronous motor 16 will have a frequency of 240 cycles per second, which is the difference between 5040 cycles and 4800 cycles. Under these conditions the synchronous motor will operate at the practical speed of 1800 R. P. M. It will be readily understood that, if the speed of the shaft upon which the motor and generator are mounted varies on either side of synchronism, the synchronous effort of the system will be exerted in the opposite direction. Thus, if for any reason the speed tends to decrease the synchronizing frequency is increased and vice versa. It therefore follows that the system is practically devoid of hunting.

Mounted upon the same shaft 18 as the synchronous motor 16 and alternator 19, is a scanning disc 20, which is provided with a spirally arranged group of openings for the purpose of producing a picture which may be varied either on a lens 21 or on a screen mounted in front of this lens.

While the synchronizing apparatus has been illustrated and described as applied to a picture receiving apparatus, it will be readily understood by those skilled in the art that it may be utilized wherever it is desired to transmit communication signals together with a synchronizing signal which is too high to be utilized for the purpose of driving the apparatus to be synchronized. It of course has the very important advantages that it makes it possible to utilize a high frequency synchronizing signal to operate a low frequency machine which has few poles and is comparatively inexpensive and that the high frequency alternator 19 is required to generate only a small amount of power as compared with the power utilized by the motor 16.

What we claim as new and desire to secure by Letters Patent of the United States, is:

1. The combination of a radio receiver, means for supplying synchronizing and communication signals to said receiver, means for separating said synchronizing and communication signals, a synchronous motor, an alternating current generator, means comprising a two-element rectifier and a tuned amplifier for rectifying and amplifying said synchronizing signal and the current generated by said generator, and means for supplying the resulting beat frequency directly from the amplifier to said motor.

2. In picture transmission apparatus, the combination of a receiver means for supplying thereto a carrier wave modulated by the picture frequency and by a synchronizing wave of higher frequency than the picture frequency, a synchronous motor, an alternator arranged to be driven by said motor and means for supplying to said motor the beat frequency from the synchronizing wave and the alternator frequency.

3. In picture transmission apparatus, the combination of a receiver, means for supplying thereto a carrier wave modulated by the picture frequency and by a synchronizing wave of higher frequency than the picture frequency, picture producing means including a rotatable member and a light source, means for supplying the picture frequency to said source, an alternator, a low frequency synchronous motor arranged to drive the rotatable member and the alternator, and means for supplying to the motor a beat frequency obtained from the synchronizing wave and the alternator frequency.

In witness whereof, we have hereunto set our hands this 15th day of July, 1929.

MAURICE ARTZT.
ROBERT SERRELL.